United States Patent [19]

Maclaine et al.

[11] 3,723,576
[45] Mar. 27, 1973

[54] SURFACE COATING COMPOSITIONS COMPRISING BLENDS OF VINYL CHLORIDE HOMOPOLYMERS

[76] Inventors: Ian A. Maclaine, Lachine; Orest T. Semeniw, L'Acadie, Montreal, both of Quebec, Canada; Domco Industries Limited, 03, Montreal, Quebec, Canada

[22] Filed: May 11, 1970

[21] Appl. No.: 36,428

[52] U.S. Cl. ............260/899, 117/21, 117/121, 117/126 AB, 117/140 A, 117/145, 117/161 UZ, 260/92.8 R
[51] Int. Cl. .................C08f 29/24, C08f 3/30
[58] Field of Search........................260/899

[56] References Cited

UNITED STATES PATENTS

| | | | |
|---|---|---|---|
| 3,000,754 | 9/1961 | Zentmyer | 117/21 |
| 3,287,447 | 11/1966 | Faure | 260/899 |
| 3,563,936 | 2/1971 | Merrill et al. | 260/31.8 |
| 3,513,115 | 5/1970 | Tryzna et al. | 260/21 |
| 3,555,122 | 1/1971 | Simons | 260/899 |
| 3,329,642 | 7/1967 | Lima et al. | 260/31.4 |

*Primary Examiner*—Murray Tillman
*Assistant Examiner*—John Seibert
*Attorney*—Maybee and Legris

[57] ABSTRACT

A granular composition for use in the production of decorative surface coatings comprises a dry blended non-homogeneous mixture of non-adherent granules consisting of a first and a second vinyl chloride homopolymer, plasticizer, and heat and light stabilizers, the vinyl chloride homopolymers having specific viscosities in the range 0.10 – 0.15 as measured in a solution of 0.2 grams of homopolymer in 100 ml. of nitrobenzene at 25°C, the specific viscosity and average granule size of the first homopolymer being less than those of the second.

3 Claims, No Drawings

SURFACE COATING COMPOSITIONS COMPRISING BLENDS OF VINYL CHLORIDE HOMOPOLYMERS

BACKGROUND OF THE INVENTION

This invention relates to granular compositions for the production of decorative surface coverings, and to a process for the production of decorative surface coverings using such compositions.

Vinyl resins, such as polyvinyl chloride and its polymers, have been applied widely to the manufacture of decorative surface coatings, in sheet form, for flooring, wall covering, countertopping and the like, the sheeting sometimes being laminated to a strain resisting, dimension stablizing, substrate of felt or woven textile fabric. Decorative designs may be incorporated as an integral part of the sheet forming process, or applied as surface prints by laminating, coating or spraying onto a clear protective surface, or by incorporating contrasting colored particles within the wearing surface.

One known method of producing such coverings from polyvinyl chloride involves calendering the sheeting from a homogeneous compounded melt, with or without subsequent lamination to a substrate, the decorative qualities being imposed by printing or by incorporating contrasting colored particles within the wearing surface. Unless compounds containing large amounts of mineral filler are used, this method is unsuitable for the production of sheeting of thicknesses greater than about 0.020 inch, because it becomes very difficult to avoid evident inclusions and objectionable discontinuities due to the entrainment of residual vapor or air; these inclusions and discontinuities tend to restrict the process conditions, besides being detrimental to the mechanical properties of the finished product.

Another known method of producing coverings from polyvinyl chloride polymer involves spray or roll coating of a substrate with an aqueous polymer dispersion or a stable suspension of polymer particles in plasticizer, with or without the addition of volatile diluents. However, in the case of thick deposits of liquid plastisol compounds, which of necessity must contain little or no amounts of readily volatilized diluents or entrained air, it is often necessary to employ substantial quantities of relatively fugitive solvent plasticizers which are volatilized in controlled amounts during processing, thereby determining the resultant product properties. This practice is restrictive, expensive, and subjects the product to the possibility of shrinkage and an aggravated progressive drift in tensile modulus throughout the useful life of the product, due to diffusion, extraction and volatility of the plasticizer.

Yet another known method of producing coverings from polyvinyl chloride polymers, which method offers substantial advantages over the methods mentioned above, involves the steps of depositing a layer of a granular composition, heating the layer to cause the granules to adhere and form a porous layer having specific mechanical properties on cooling, and thereafter applying fluid inks which readily permeate the porous structure of the layer. In order to provide a non-porous surface, it is necessary to re-heat the layer and apply molding pressure to the surface of the layer. This method provides an advantage in extending pattern color depth and achieving dimensional texture. The method also permits the use of polymer forms which cannot readily be deposited from a liquid phase and allows a useful range of physical properties of the products to be obtained without resort to expensive compounding, calendering or extrusion processes.

SUMMARY OF THE INVENTION

The present invention is based on the discovery that by the judicious selection of number average molecular weights of polyvinyl chloride resins, useful products can be manufactured by the last mentioned method but without the application of molding pressure.

According to stablizer, present invention, there is provided a granular composition comprising a dry blended non-homogeneous mixture of non-adherent granules consisting of vinyl chloride homopolymer, plasticizer, and heat and light stablizer, the vinyl chloride homopolymer having a specific viscosity in the range 0.10 – 0.15 as measured in a solution of 0.2 grams of homopolymer in 100 ml. of nitrobenzene at 25°C.

The invention also provides a granular composition comprising a dry blended non-homogeneous mixture of non-adherent granules consisting of a first and a second vinyl chloride homopolymer, plasticizer, and heat and light stablizer, the vinyl chloride homopolymers having specific viscosities in the range 0.10 to 0.15, the specific viscosity and average granule size of the first polymer being distinctly less than those of the second.

Non-porous decorative surface coverings having an inlaid decoration can be produced in accordance with the invention by depositing fine granules of a composition as described above to form a smooth layer on the surface of a backing sheet, heating the layer to cause sintering of the granules without complete coalescences thereof to form a layer of uniform porosity, applying a printing composition to the sintered layer in a sufficient amount to permeate into the porous structure, and heating the printed, sintered layer to the fusion temperature of the composition, without the application of molding pressure, to form a non-porous surface.

DESCRIPTION OF THE PREFERRED EMBODIMENTS

A surface covering is produced in accordance with the present invention by depositing onto a suitable backing sheet a smooth uniform layer of a granular composition consisting essentially of a polyvinyl chloride component, a plasticizer component and a heat and light stabilizer component. It is usually also necessary to include in the composition, an acid acceptor and a phosphite chelator in accordance with standard practice. The thickness of the layer may be about 0.060 inch. The backing sheet is preferably a suitably waterproofed and impregnated web of felted cellulose, asbestos fibrous sheet, or woven textile fabric, having a surface coating of adhesive to retain the deposited layer. The layer of granules is next sintered without causing complete coalescence thereof by heating in an oven, the resultant structure being of uniform porosity. A decorative design is printed onto the surface of the partially sintered layer, in accordance with the chosen design by applying printing compositions in amounts sufficient to permeate the porous structure of the layer to a depth not less than 0.020 inch or one third of the thickness of the partially sintered layer. The printing compositions, which may be any of many known compositions for the purpose, are preferably stable suspensions of polyvinyl chloride resin and color pigments in a liquid plasticizer for the resin. After printing, heating is continued to the fusion temperature of the layer, without the application of moulding pressure, until a non-porous integral composition state is attained.

The process according to the invention as described above is basically similar to known processes for producing decorative surface coverings of this type, but differs therefrom in respect of the granular compositions used and the nature of the final heating step. Hitherto it has been necessary to apply moulding pressure in the final heating step to obtain a smooth non-porous surface. The present invention, on the other hand, is based on the discovery that by judicious selection of the number average molecular weights of the polyvinyl resins used, useful products can be manufactured without the application of moulding pressure in the final heating step. In addition, by selection of thermal treatment conditions, control can be exercised over the partially sintered composition strength so as to obtain specific desirable textures.

The limiting specific viscosities of polyvinyl chloride homopolymers which may usefully be applied to the manufacture of protective and decorative surface coverings, without resort to the application of moulding pressures, are determined by the inherent thermal stability of each polymer and compound composition, the melt flow susceptibility of the compound and the mechanical properties, optical properties and textures derived.

Table I illustrates that the mechanical properties, that is to say tensile strength, tensile modules and hardness, and reflectance properties of products obtained from sinterable compositions prepared from polymers of similar particle size range are highly dependent upon the specific viscosity of the polymer. The specific viscosity is of course an indication of the number average molecular weight of the polymer.

TABLE I

| Specific Viscosity of polymer $\eta_{sp}$ 225°C. | Properties Obtained from Sintering .060" Thick Deposit on Glass at 225°–230°c. for 4 minutes. | | | | Time Required for Optimum Flow (1) |
|---|---|---|---|---|---|
| | Ultimate Tensile Strength | 15% Tensile Modulus | 60° Spectral Reflectance | Shore B Hardness 25°C. | Minutes at |
| | Pounds per Sq. Inch | | | | |
| 0.10 | 1630 | 450 | 94 | 77 | 4 |
| 0.13 | 1930 | 520 | 33 | 79 | 5 |
| 0.15 | 1970 | 450 | 12 | 80 | 7 |
| 0.17 | 900 | 350 | 4 | 61 | 9 |
| 0.20 | 830 | 320 | 4 | 57 | 11 |
| 0.24 | 14 | 7 | 3 | 41 | 15 |

(1) 60° spectral reflectance (ASTM D-523) >90, except for 0.24 specific viscosity with a max. value of 24.

Although it is known the melt flow properties of a composition are influenced by the type and concentration of plasticizers, the experimental results given in Table I show that, for a fixed plasticizer concentration and particle size, specific viscosities of the polymer lying between 0.10 and 0.15 offer the greatest advantages in respect of the mechanical properties and appearance attributes of the product. It is to be noted that the highest values of tensile strength, hardness and thermal stability for minimum heating intervals are obtained in those cases where the specific viscosity of the polymer lies in the range 0.10 to 0.15. The values of viscosity are as measured in a solution of 0.2 grams of homopolymer in 100 ml. of nitrobenzene at 25°C.

An important discovery according to the invention is that the partially sintered strength of polymer compositions can be increased by incorporating quantities of lower number average molecular weight polymer particles of smaller particle size, which will soften more readily and adhere to the larger polymer particles to form a coherent mass while preserving the porous nature of the aggregate.

TABLE 2

| Compound (1) Composition % | Time at 225°C. (sec.) | Tensile (2) Strength at 20±1°C (lbs/in²) | Permeation (3) Ratio |
|---|---|---|---|
| 100 | 45 | 30 | 0.4 |
| | 90 | 113 | 0.5 |
| | 120 | 683 | 0.0 |
| 50 | 45 | 12 | 0.6 |
| | 90 | 22 | 0.7 |
| | 120 | 108 | 0.8 |
| 25 | 45 | 4 | 0.9 |
| | 90 | 6 | 0.9 |
| | 120 | 84 | 0.9 |
| 0 | 45 | 2 | 1.0 |
| | 90 | 5 | 1.0 |
| | 120 | 48 | 1.0 |

(1) Proportion of 0.10 specific viscosity (measured by Ostwald efflux viscometry of 0.2 grams of resin in 100 ml. nitrobenzene at 25°C.) polymer of a particle size range of 6 to 10 thousandths of an inch diameter replacing 0.13 specific viscosity polymer of a 6 to 16 thousandths of an inch diameter particle size range.
(2) Tensile strength of .060" ±.005" thickness of granular deposits when subjected to 225°C. heating for 45 seconds upon 0.085 inch thickness glass plate.
(3) Permeation ratio is measured as the proportion of the partially sintered thickness which is permeated by 0.1 ml. drop of 2000 centipoise viscosity plastisol ink within 10 minutes of deposit at 25°C. temperature, when applied to a .060" ±005" partially sintered compound deposit.

The results given in Table II indicate that two-fold and six-fold increases, respectively, in sinter strength are obtained, while the permeabilities are depreciated only 10 percent and 40 percent respectively, as the concentration of homopolymer of 0.10 specific viscosity and particle size range 0.006 inch to 0.010 inch, is increased from 0 to 0.25 to 0.50 composition fraction, the composition being subjected to heating at 225°C. for 45 seconds. Permeation ratios rise slightly with increasing periods of heating for the 0.5 fraction of 0.10 viscosity homopolymer in 0.13 specific viscosity homopolymer of 0.006 inch to 0.016 diameter particle size range. However, when the 0.10 viscosity homopolymer is less than 0.25 of the whole the permeation ratios remain substantially constant during the 45 to 120 second interval at 225°C. When all the resin consists of the 0.10 specific viscosity homopolymer, the permeation ratio of the partially sintered product drops progressively and rapidly as the heating time increases.

It has been found advantageous to work with partially sintered compositions possessing a tensile strength of 10 pounds per square inch or higher and a permeability ratio greater than 0.6.

An investigation was made as to the effect of polymer particle size range upon the permeation of the partially sintered layer by printing composition. A composition of polymers of 0.10 and 0.13 specific viscosity was fractionated by screening into various particle size ranges and compounded by a standard dry-blending technique with plasticizers and stabilizers. The composition was deposited as a layer of from 0.05 to 0.06 inch thickness upon a glass plate of 0.085 inch thickness, and heated for 30 seconds at a temperature of 220° to 225°C. Table III shows the ink permeation ratios that were observed for each of the indicated particle size fractions.

TABLE III

| Particle Size Range (.001" diameter) | Permeation Ratio |
|---|---|
| 1–3 | 0.3 |
| 3–4 | 0.4 |
| 6–10 | 0.5 |
| 10–16 | 1.0 |

It is also observed that as particle size range rises the tensile strength diminishes for any given specific viscosity of polymer and heat treatment.

Moreover, the porosity of the individual polymer particles, which is related to the mode of manufacture of the polymer, contributes significantly to the fluid permeability of the partially sintered composition layers. Polymer particles are characterized as to their absorptivity by a procedure of liquid mercury intrusion porosimetry. A measure of this influence upon permeation is shown in Table IV for polymers in the particle size range 0.006 inch to 0.010 inch.

TABLE IV

| Mercury Intrusion Porosity (ml/100 gms) | Permeation Ratio |
|---|---|
| 20 | 0.8 |
| 5 | 0.5 |

Following the experimental results described above, compositions suitable for the production of surface coverings in accordance with the invention were produced. Each composition consisted essentially of a polyvinyl chloride resin component, a plasticizer, a heat and light stabilizer, and a phospite chelator, the function of the last component being to protect the composition by tying up free polyvalent ions that would otherwise promote degradation. The specific examples of such compositions are as follows, the components being expressed in parts per hundred by weight of the resin component.

Example I

| | Parts by weight |
|---|---|
| Polyvinyl Chloride (1) | 50.0 |
| Polyvinyl Chloride (2) | 50.0 |
| Polyvinyl Chloride (3) | 2.0 |
| Phosphite Chelator | 0.73 |
| Organo Barium, Cadmium, Zinc Stabilizer (Mark 739) | 2.0 |
| Iso Decyl Benzyl Phthalate | 34.0 |
| Paraplex G-62 | 7.0 |
| | 145.73 |

Example II

| | Parts by weight |
|---|---|
| Polyvinyl Chloride (1) | 75.0 |
| Polyvinyl Chloride (2) | 25.0 |
| Butyl Benzyl Phthalate | 14.5 |
| Di-iso-octyl Phthalate | 14.5 |
| Epoxidized Soyabean Oil | 5.0 |
| Alkyl Tin Mercaptide | 2.0 |
| Phosphite type chelator | 0.73 |
| | 136.73 |

Example III

| | Parts by weight |
|---|---|
| Polyvinyl Chloride (1) | 100 |
| Tin Carboxylate | 2.0 |
| Phosphite Chelator | 0.73 |
| Di-Iso Octyl Phthalate | 50.0 |
| | 152.73 |

In these examples, "polyvinyl chloride (1)" is a polyvinyl chloride homopolymer in powder form with a particle size range of 0.006 inch to 0.016 inch diameter, and having a specific viscosity of 0.13 as measured in a solution of 0.2 grams of the homopolymer in 100 ml. of nitrobenzene at 25°C. "Polyvinyl chloride (2)" is a polyvinyl chloride homopolymer in powder form with a particle size range of 0.002 inch to 0.008 inch diameter, and having a specific viscosity of 0.10 as measured in a solution of 0.2 grams of the homopolymer in 100 ml. of nitrobenzene at 25°C. "Polyvinyl chloride (3)" is a polyvinyl chloride homopolymer in powder form with a particle size range of 5 to 10 microns (0.0002 to 0.0004 inch approximately) diameter, and having a specific viscosity of 0.23 as measured in a solution of 0.2 grams of the homopolymer in 100 ml. of nitrobenzene at 25°C.

In making the compositions of Examples II and III the polyvinyl chloride resin components were first added to a high speed Henschel type mixer, and the temperature of the powders was allowed to rise by kinetic energy of the impeller. When the temperature had risen to 60°C the liquid components, after blending, were added in spray form. The temperature of the mix was allowed to rise to 95°C at which time the material was cooled by being discharged into a jacketed cooling vessel. Alternatively a refrigerated fluid might have been passed through the jacket of the mixer operated at low speed. When the temperature had been reduced to 35°C the liquid components had been wholly absorbed by the powder, the resultant mix being a granular composition ready for use or storage.

The composition of Example I was made in the same manner except that the resin component, polyvinyl chloride (3), was added at or towards the end of the cooling cycle, the purpose of this component being to improve the flow properties of the composition.

The amount of plasticizer in the composite can be varied considerably with consequent effects on the mechanical properties of end products, as will be appreciated by those skilled in the art. In Examples I, II, and III, the parts by weight of total plasticizer were 41.0, 34.0 and 50.0 respectively. In general, compositions useful for the production of surface coverings may contain plasticizer in amounts from 25 to about 70 parts by weight, measured against 100 parts by weight of polyvinyl chloride, but it will be appreciated that the greater the amount of plasticizer the softer and more pliable will be the final end product. A composition containing, say, from 30 to 50 parts by weight of plasticizer would be well suited for forming coverings on rigid or semi-rigid supporting substrates. For certain applications, including the formation of flexible sheeting or coverings on non-rigid substrates it is preferred that the plasticizer be present in an amount from 50 to about 70 parts by weight.

Table V below indicates how the mechanical properties of the coating are dependent upon varying plasticizer concentrations of the composition.

TABLE V

| Plasticizer Concentration parts/hundred | 30 | 40 | 50 |
|---|---|---|---|
| Tensile Strength (lbs/in²) | 2000 | 2500 | 2700 |
| Flexural Modulus (lbs/in²) | 42,000 | 23,000 | 10,000 |
| Hardness (Shore B units) | 88 | 83 | 80 |

What we claim as our invention is:

1. A granular composition comprising a dry-blended non-homogeneous mixture of non-adherent granules consisting of a first and a second vinyl chloride homopolymer, plasticizer, and heat and light stabilizers, the first vinyl chloride homopolymer having a particle size range 0.006 inch – 0.010 inch and the second vinyl chloride homopolymer having a particle size range 0.006 inch – 0.016 inch, and each of said vinyl chloride homopolymers having a specific viscosity in the range 0.10 – 0.15 as measured in a solution of 0.2 grams of homopolymer in 100 ml. of nitrobenzene at 25°C., the specific viscosity and average particle size of the first homopolymer being less than those of the second.

2. A granular composition comprising a dry-blended non-homogeneous mixture of non-adherent granules consisting of a first and a second vinyl chloride homopolymer, plasticizer, and heat and light stabilizers, the first vinyl chloride homopolymer having a specific viscosity of about 0.10 and a particle size range 0.006 inch – 0.010 inch and the second vinyl chloride homopolymer having a specific viscosity of about 0.13 and a particle size range 0.006 inch – 0.016 inch, said specific viscosities being as measured in a solution of 0.2 grams of homopolymer in 100 ml. of nitrobenzene at 25°C and said particle size of the first homopolymer being less than that of the second.

3. A granular composition according to claim 2, wherein the ratio of the first homopolymer to the second is from 1:3 to 1:1.

* * * * *